No. 681,396. Patented Aug. 27, 1901.
M. JUNGNICKEL.
MACHINE FOR GRINDING FACETS ON GLASSES FOR SPECTACLES.
(Application filed Sept. 25, 1899.)
(No Model.) 2 Sheets—Sheet 1.

Witnesses: Inventor
Max Jungnickel

No. 681,396. Patented Aug. 27, 1901.
M. JUNGNICKEL.
MACHINE FOR GRINDING FACETS ON GLASSES FOR SPECTACLES.
(Application filed Sept. 25, 1899.)
(No Model.) 2 Sheets—Sheet 2.
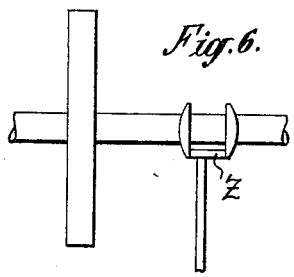
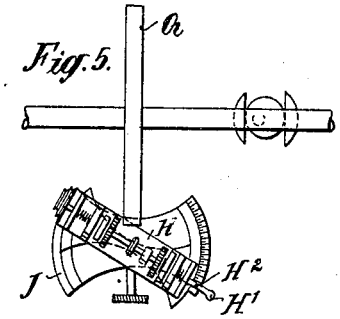
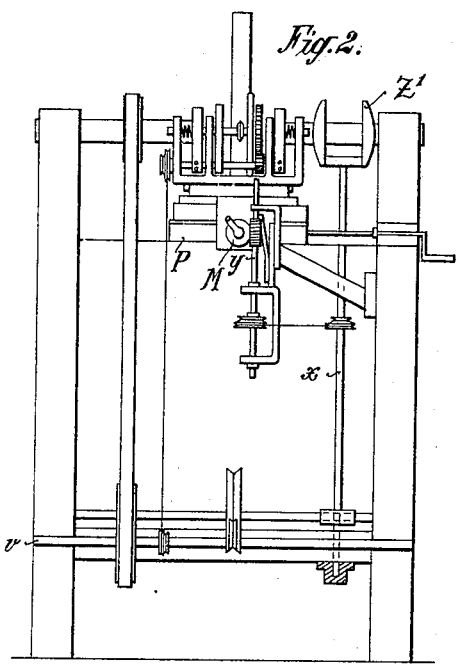
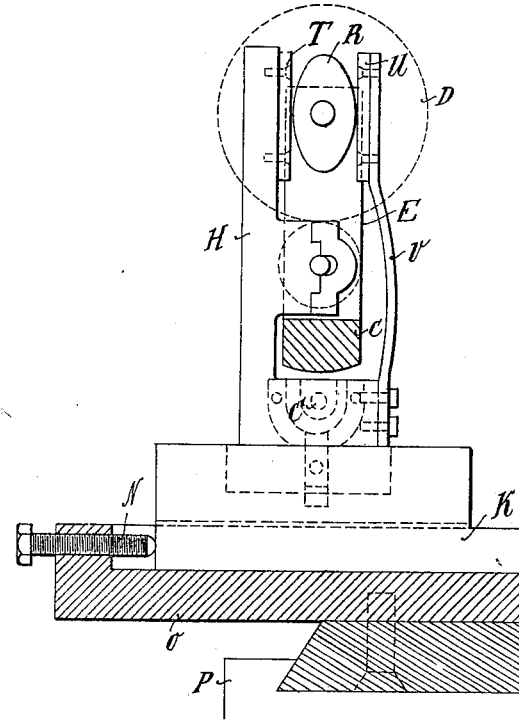
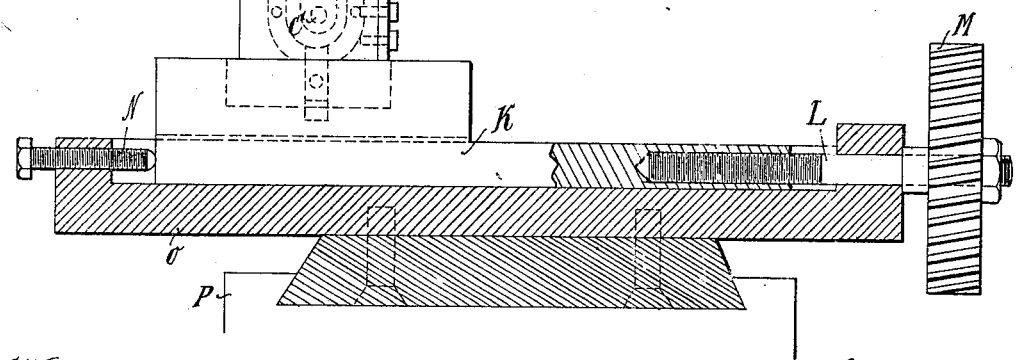
Witnesses:
Inventor:

UNITED STATES PATENT OFFICE.

MAX JUNGNICKEL, OF RATHENOW, GERMANY.

MACHINE FOR GRINDING FACETS ON GLASSES FOR SPECTACLES.

SPECIFICATION forming part of Letters Patent No. 681,396, dated August 27, 1901.

Application filed September 25, 1899. Serial No. 731,652. (No model.)

*To all whom it may concern:*

Be it known that I, MAX JUNGNICKEL, optician, a subject of the German Emperor, residing at Rathenow, in the Kingdom of Prussia, German Empire, have invented a certain new and useful Machine for Grinding Facets on Glasses for Spectacles and the Like, of which the following is a specification.

This invention relates to machines adapted for grinding facets on glasses for optical purposes, spectacles, and the like, and is intended to obviate the difficulties presented by the machines heretofore in use for that purpose, in which it was either necessary to remove the glass from its support after the grinding of one side of the facet and then adjust it again for the grinding of the other side, which gave rise to frequent and very annoying irregularities in the configuration of the facets, or which could only attain this purpose by the use of two grinding-stones, the edges of which were set at an angle corresponding to the angle of the beveled edge it was desired to obtain. Furthermore, the grinding-machines in use heretofore for optical glasses were merely intended to set the edge of the glass, so that it was always only with great difficulty that facets on the body of the glass itself could be obtained by such machines with even an approximation of accuracy.

By the invention forming the subject of this application facets may be ground upon such glasses by the employment of one grindstone only and without the necessity of removing the glass for the grinding of the other side of the facet, thus securing perfect symmetry of both sides of the facet.

The machine is especially distinguished by the use of a frame having suitable clamps for the attachment of the glasses to be worked and which receives an oscillating movement in accordance with the oval form of the glasses, the distance of the frame from the grinding-stone being adjusted by means of a carriage and suitable gearing, while it is further capable of adjustment in a direction inclined toward the position of the grindstone by means of a rotatable frame, so as to allow of subjecting first one and then the other side of the facet to the grinding action.

My invention is illustrated in the accompanying drawings, which represent a machine embodying my invention.

Figure 1:
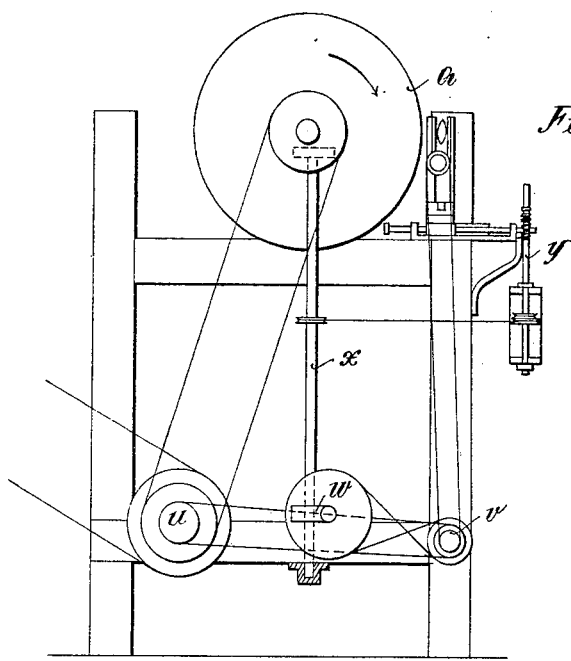
Figure 3:
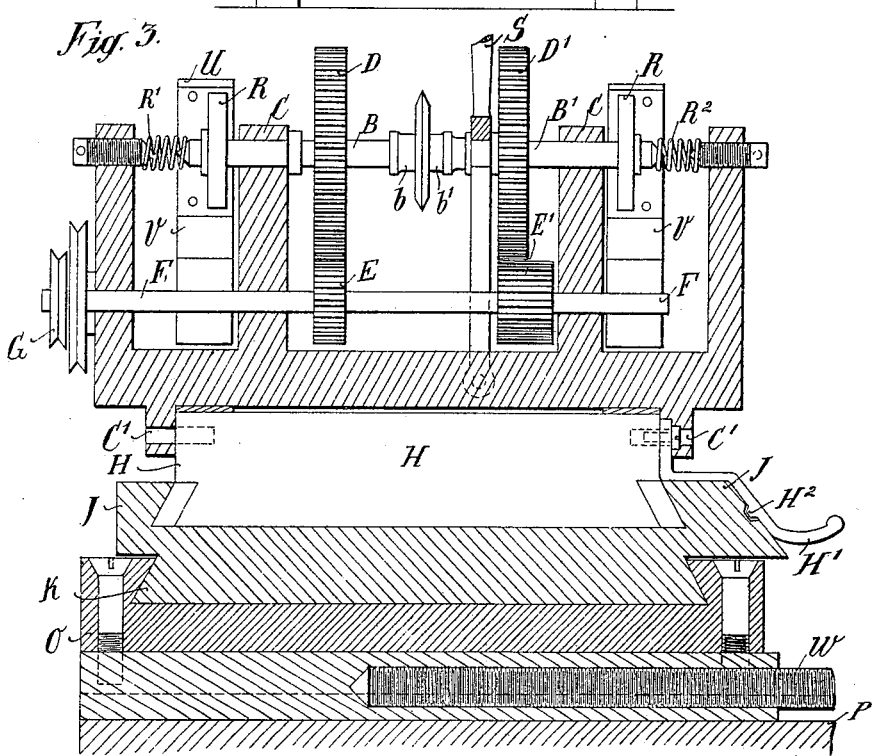

Figure 1 is a vertical longitudinal section of the machine. Fig. 2 is a front view of the machine. Fig. 3 is a longitudinal section of the frame for fastening the glasses. Fig. 4 is a cross-section of the said frame. Fig. 5 is plan view illustrating the different positions of the fastening-frame with relation to the grindstone. Fig. 6 is a detail of the arrangement for reciprocating the grindstone.

$a$ is the glass to be operated upon and which is fastened between the jaws of the clamp $b\ b'$, said jaws being attached to the shafts B B', and which are placed so as to be forming one straight line with their respective axes.

$R'\ R^2$ are springs which serve to tightly press the two jaws against each other.

S is a hand-lever, by means of which the shaft B' may be separated from the shaft B against the tension of its spring $R^2$ in order to remove the glass or exchange it against another. The shafts are journaled in the frame C, which is pivoted at C' to the frame H, so as to be able to reciprocate in accordance with the oval shape of the glass, the frame H being made to turn upon a horizontal plate J.

F is the driving-shaft, journaled upon the frame H and receiving its motion from the pulley G and to which gear-wheels E E' are keyed, engaging with the toothed wheels D D' upon the shafts B B'.

Oval-shaped disks R, of steel or other suitable material, are attached to the shafts B B' adjacent to the plates T, of steel or other suitable material, fastened to the frame H. Springs V, having steel plates U, serve to press the disks R against the frame H. Upon rotating the shaft F this arrangement causes a rocking motion of the frame C with its shafts B B', thereby also rocking the glass $a$, fastened between the jaws $b\ b'$, in accordance with the configuration of the disks R. Upon now turning frame H, as represented in Fig. 5, upon the table J, to which it is pivoted, as shown in Fig. 4 of the drawings, so as to assume an inclined position with relation to the grinding-stone Q, and upon now advancing the carriage K, upon which the table J is fastened, in the direction of the grindstone, one side of the facet will be ground exactly corresponding to the form of the disks R. When the grinding of one side of the facet has been finished, the frame H is turned so as to form an angle in the reverse direction and the other side of the facet ground as usually.

A spring H' is fastened to the frame H, a pin H² being further provided and fitting into corresponding openings of the sector J', fastened to the edge of the table J, so as to allow of an exact adjustment of the frame H in its respective positions.

The forward movement of the carriage K, bearing the frame H, is effected by means of a screw L, rotating in the guideway O and bearing at its end the worm-wheel M, which engages with the endless screw $y$, moved by the shaft X by means of strings, pulleys, or other suitable gearing. The forward movement of the carriage K is limited by the adjustable stop N. In the arrangement represented in the drawings the guideway O is also adjustable in a transverse direction by means of the screw W, fixed upon the transverse carriage P, so as to be able to also adjust the glass in a transverse direction with relation to the grindstone.

Motion is imparted to the driving-shaft F from the pulley G, rotated by a string or belt from the shaft $v$, which in its turn receives its motion from the main driving-shaft $u$. Shaft $v$ imparts motion to the shaft $w$, which by means of a screw and worm-wheel rotates shaft X. The upper end of said shaft X is provided with an adjustable cam-disk Z, Fig. 6, which actuates the two disks Z' of the shaft of the grindstone, and thereby slowly reciprocates the grindstone.

Instead of pivoting the frame C to the frame H at their lower ends it will be found convenient for some purposes to use the driving-shaft F as a pivot for the frame C, nothing being changed as regards the engagement of the gear-wheels E D E' D'.

The mode of operation of the machine is as follows: The optical glass being securely fastened between the jaws $b\,b'$, flat spring H' is slightly raised and frame H is then shifted upon its turn-table until the pin H² exactly registers with the desired point of the scale attached to the sector J'—say thirty degrees. The spring H' being then released, its tension will be sufficient to securely hold the frame H during the process of grinding. When the grinding of one side of the facet is finished, the glass is shifted in the same manner to the opposite direction without difficulty. If desired, it is obvious that a similar scale can be provided at the opposite end of the turn-table J, which of course also necessitates the attachment of a second flat spring H' at the opposite end of the frame H.

What I claim, and desire to secure by Letters Patent of the United States, is—

In a machine for grinding facets to optical glasses the combination with a traveling carriage and a rocking frame and former mounted thereon of a vertically-rotatable frame for the support of the rocking frame, a scale on the traveling carriage whereby the rotatable frame may be set at any desired angle to the grindstone substantially as described.

In witness whereof I have hereunto set my hand in the presence of two witnesses.

MAX JUNGNICKEL.

Witnesses:
 HENRY HASPER,
 WOLDEMAR HAUPT.